(12) United States Patent
Tung

(10) Patent No.: US 7,308,231 B2
(45) Date of Patent: Dec. 11, 2007

(54) COMPUTER MOUSE WITH BLUETOOTH HAND-FREE HANDSET

(75) Inventor: Chia-Chun Tung, Taipei (TW)

(73) Assignee: BlueExpert Technology Corporation, Taipei (TW)

( * ) Notice: Subject to any disclaimer, the term of this patent is extended or adjusted under 35 U.S.C. 154(b) by 376 days.

(21) Appl. No.: 10/989,323

(22) Filed: Nov. 17, 2004

(65) Prior Publication Data

US 2006/0009154 A1    Jan. 12, 2006

(30) Foreign Application Priority Data

Jul. 8, 2004    (TW) .............................. 93210804 U

(51) Int. Cl.
*H04B 7/00* (2006.01)
*H04B 1/38* (2006.01)
*H04M 1/00* (2006.01)
*G06F 3/033* (2006.01)
*G09G 5/08* (2006.01)

(52) U.S. Cl. .................. 455/41.2; 455/569.1; 455/570; 345/163

(58) Field of Classification Search ............. 455/569.1, 455/569.2, 570, 575.9, 90.2, 41.2, 572; 345/156, 345/163, 164, 165, 166, 167
See application file for complete search history.

(56) References Cited

U.S. PATENT DOCUMENTS 6,223,025 B1 *  4/2001  Tsukuda ................. 340/7.37
6,405,027 B1 *  6/2002  Bell ....................... 455/403
7,106,357 B2 *  9/2006  Fukuda et al. .......... 348/14.02
2002/0051337 A1 *  5/2002  Hyun ..................... 361/680
2002/0052182 A1 *  5/2002  Mayuzumi ............... 455/41
2003/0040903 A1 *  2/2003  Gerson .................... 704/211
2004/0203382 A1 * 10/2004  Park ...................... 455/41.2
2004/0234084 A1 * 11/2004  Isberg et al. ............. 381/113
2006/0007151 A1 *  1/2006  Ram ...................... 345/163
2006/0030263 A1 *  2/2006  Seligmann et al. ...... 455/41.2
2006/0143465 A1 *  6/2006  Lai et al. ................. 713/182

* cited by examiner

*Primary Examiner*—Nay Maung
*Assistant Examiner*—Andrew Wendell
(74) *Attorney, Agent, or Firm*—Troxell Law Office, PLLC

(57) ABSTRACT

The invention discloses a computer input device with Bluetooth hand-free handset comprises: an electric source module, for providing power to the computer input device, comprising a voltage step-up circuit and a battery, in which the battery can be an one-time-battery or a rechargeable battery used as the electric source for the computer input device; an optical mouse circuit, for detecting movement vector caused by a movement of the computer input device by the principles of optical transmitting and receiving; a Bluetooth module, coupled to the optical mouse circuit, wherein the module is further connected to an antenna for transmitting/receiving signals, a power LED for indicating whether the computer input device is powered, and a link LED for indicating whether the computer input device is in a communication state; an echo cancellation circuit, coupled to the Bluetooth module and used for canceling echoes of audio signals; a sound receptor, coupled to the echo cancellation circuit for receiving the audio signals; an audio signal amplifying circuit, coupled to the echo cancellation circuit for receiving and amplifying the audio signals outputted from the echo cancellation circuit; and a loudspeaker, coupled to the audio signal amplifying circuit for playing sounds corresponding to the audio signals from the audio signal amplifying circuit.

11 Claims, 2 Drawing Sheets

COMPUTER MOUSE WITH BLUETOOTH HAND-FREE HANDSET

FIELD OF THE INVENTION

The present invention relates to a computer input device, preferably a computer mouse with a Bluetooth hand-free handset, and more particularly, to a Bluetooth-enabled computer mouse that is adapted for mobile phone and Internet phone applications.

BACKGROUND OF THE INVENTION

The 3C computer products, such as computer, communication devices and consumer products, have played an important role in our daily life, both at homes and at working places. Further, the operating system (OS) for has evolved from the command mode of early DOS where instructions are to be inputted one by keyboard to the Windows of today's computer where instructions can be inputted simply by clicking a mouse. Through the mouse, a cursor on a display of a computer may be moved freely and thus icons on the window may be clicked and selected. In this regard, mouse is a very convenient and important input device for a computer.

With the advance of technology, mouse and keyboard both have evolved from wired communication devices into wireless communication devices, that enable the two to be used in a wider range of operating environment. That is, owing to the wireless communication capability, the mouse and keyboard can be exempted from the constraint of cables enabling the two to be used in many more applications. Therefore, wireless input devices will apparently become a main trend. However, since the current mice usually employ radio frequency (RF) signal for transmitting information, although such scheme of information transmitting may has a advantage of lower cost, the wireless capability may be limited to fewer applications. In this regard, Bluetooth technology, equipped with strong short-distance wireless communication capability and rapidly lowing price, is a wireless communication technology having been gradually adopted in wireless communication products since it can transmitting and receiving signals stably and wirelessly. With the advance and maturity of the Bluetooth technology, the cost of a Bluetooth chip, controlling Bluetooth wireless signal transmissions, has become lower and lower since new Bluetooth-enabled mobile phones have reached the market in large number and the cost therefore is correspondingly reduced. It should be envisaged that a Bluetooth module corresponding to the Bluetooth chip may be incorporated into an input device of a computer, e.g. a mouse, so that the input device may perform more diverse functions as compared to the current input devices.

SUMMARY OF THE INVENTION

In view of the shortcomings encountered in the prior art, it is an object of the present invention to provide a computer input device having a Bluetooth hand-free handset, in which a Bluetooth chip, a microphone and a loudspeaker are integrated into the input device, such as mouse keyboard, etc. When a user operates the computer through such input device, the user may be benefited with a communication function provided by a Bluetooth-enabled mobile phone and/or an Internet phone by way of the selecting of the input device and using the same as a hand-free handset of the selected Bluetooth-enabled communication device. That is, when the Bluetooth-enabled mobile phone and the Internet phone are both provided and ready for communication, the input device may be used as a hand-free handset for the one of the two selected automatically or manually by a function key on the input device. In addition, as the input device can be used as the Bluetooth free-hand handset of selected communication device, electromagnetic wave generated by the selected communication device while it is being used will have less effect on the user since the input device acted as a speaker phone can be kept a distance away from human head.

It is another object of the present invention to provide a computer mechanism enabling a Bluetooth-enabled computer to be automatically locked up while detecting no Bluetooth signal available. That is, when a user needs to walk away from the computer which the user was using, he can simply bring the Bluetooth input device with him and the computer will lock itself up automatically through the mechanism when the computer may not detect signals emitted from the Bluetooth input device, so that may achieve a function of protecting data and information in the computer, and when the user is back to the computer, the computer may automatically unlock itself since the computer once again detects the signals emitted from the Bluetooth input device.

It is yet another object of the present invention to provide a input device with Bluetooth hand-free handset capable of being used in a car as a hand-free car kit by matching the same with a mobile phone, so that enables the input device with Bluetooth hand-free handset of the invention to be used in various applications.

To best describe the objects, features and principles of the present invention, the present invention will be explained below by way of the following preferred embodiments as well as the accompanying drawings.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
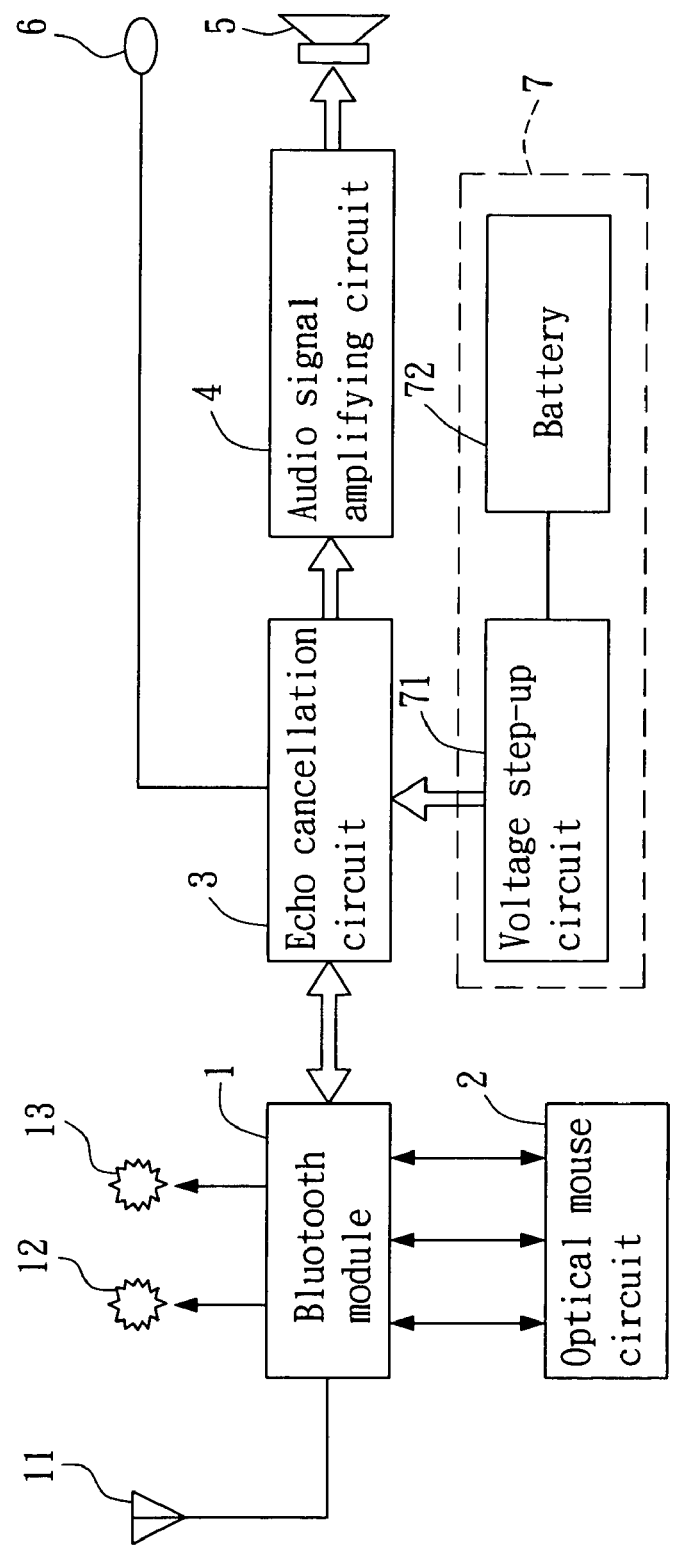
FIG. 1 is a functional block diagram of a Bluetooth wireless mouse according to the present invention.

Please refer to FIG. 1, which is a functional bock diagram of a Bluetooth-enabled computer input device (hereinafter, referred to as a computer input device) according to the present invention. The computer input device equipped with a Bluetooth hand-free handset has a function key (not shown) arranged at the exterior of the same, wherein the function key is employed for switching communication modes manually in addition to the automatic switching capability of the Bluetooth hand-free handset. In a preferred embodiment, the computer input device with Bluetooth hand-free handset comprises:

an electric source module 7, for providing power to the computer input device, comprising a voltage step-up circuit 71 and a battery, in which the battery can be an one-time-battery or a rechargeable battery used as the electric source for the computer input device;

an optical mouse circuit 2, for detecting movement vector caused by a movement of the computer input device by the principles of optical transmitting and receiving;

a Bluetooth module 1, coupled to the optical mouse circuit 2, wherein the module 1 is further connected to an antenna 11 for transmitting/receiving signals, a power LED (light-emitting diode) 12 for indicating whether the computer input device is powered, and a link LED 13 for indicating whether the computer input device is in a communication state;

an echo cancellation circuit 3, coupled to the Bluetooth module 1 and used for canceling echoes of audio signals;

a sound receptor 6, coupled to the echo cancellation circuit 3 for receiving the audio signals;

an audio signal amplifying circuit 4, coupled to the echo cancellation circuit 3 for receiving and amplifying the audio signals outputted from the echo cancellation circuit 3; and a loudspeaker 5, coupled to the audio signal amplifying circuit 4 for playing sounds corresponding to the audio signals from the audio signal amplifying circuit 4.

Although the above embodiment is substantially a mouse with Bluetooth hand-free handset, those persons skilled in the art may realize that a keyboard having components similar to those of the mouse with Bluetooth hand-free handset of the abovementioned embodiment can achieve the same result. The only difference is to replace the optical mouse circuit 2 with an input driving circuit for receiving the signals generate by tapping the keyboard. The Bluetooth keyboard has the components and structure similar to those of conventional keyboard and will not be described further hereinafter.

Figure 2:
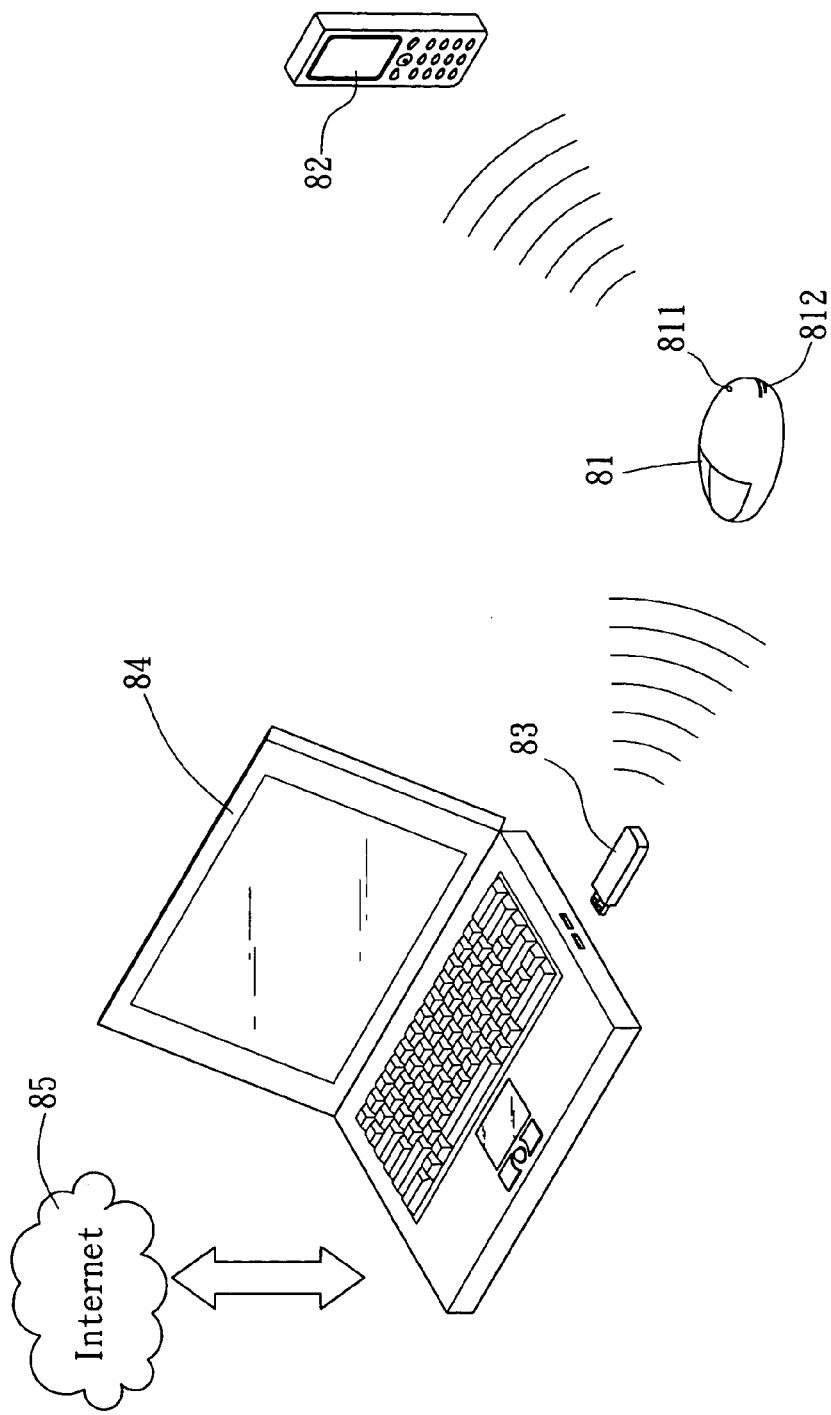
FIG. 2 is a schematic illustration showing the application of the Bluetooth wireless mouse according to a preferred embodiment of the present invention.

Please refer to FIG. 2, which is a schematic illustration showing the application of the Bluetooth mouse according to a preferred embodiment of the present invention. As shown, the Bluetooth optical mouse 81 has a loudspeaker 811 and a microphone 812 which can match with a mobile phone 82 and a computer 84 with built-in or external Bluetooth module at the same time. In this embodiment, a notebook computer is used as the computer 84 and is connected to a Bluetooth device 83 through an USB interface so as to match with a bluetooth optical mouse 81. It is generally known for those skilled in the art that a built-in Bluetooth module of a notebook computer or desktop computer can have the same effect as the external Bluetooth device 83. Further, the notebook computer 84 is coupled to a network system 85, such as the Internet, so that the computer 84 is equipped with a function of Internet phone communication. In the Bluetooth-enabled optical mouse 81, the Bluetooth module has three audio signal transmission channels, or seven data transmission channels, or one audio signal transmission channel and five data transmission channels, or two audio signals transmission channels and three data transmission channels. Accordingly, the Bluetooth optical mouse 81 may stay in simultaneous wireless communications with the mobile phone 82, the Internet phone, and the computer 84. When either the mobile phone 82 or the Internet phone of the computer 84 has an incoming call, the handset in the Bluetooth optical mouse 81 is switched to the one having the incoming call automatically. If any incoming call is made from the other phone, the latter incoming call is blocked and notified with an audio message associated with the busy line state.

The above-mentioned Bluetooth optical mouse also can provide a computer mechanism enabling a Bluetooth-enabled computer to be automatically locked up while detecting no Bluetooth signal available. That is, when a user needs to walk away from the computer which the user was using, he can simply bring the Bluetooth input device with him and the computer will lock itself up automatically through the mechanism when the computer may not detect signals emitted from the Bluetooth input device, so that may achieve a function of protecting data and information in the computer, and when the user is back to the computer, the computer may automatically unlock itself since the computer once again detects the signals emitted from the Bluetooth input device.

Further, the Bluetooth optical mouse, as the most preferred embodiment of the computer input device, may be advantageously used as a hand-free car kit for a mobile phone in specific environments, particularly in a car environment, so that enables the input device with Bluetooth hand-free handset of the invention to be used in various applications. That is, when a user is driving a car, he may communicate with a individual through the Bluetooth optical mouse instead of directly through the mobile phone. Therefore, the inventive Bluetooth optical mouse may feature a multiple of useful functions.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A computer mouse with Bluetooth hand-free handset, capable of matching and communicating with a Bluetooth-enabled wireless communication device, comprising:

an electric source module, for providing power to the computer mouse;

an optical mouse circuit, for detecting a movement vector caused by a movement of the computer mouse by principles of optical transmitting and receiving to control a computer;

a Bluetooth module, coupled to the optical mouse circuit, wherein the Bluetooth module is connected to an antenna for transmitting/receiving signals;

an echo cancellation circuit, coupled to the Bluetooth module and used for canceling echoes of audio signals;

a sound receptor, coupled with the echo cancellation circuit for receiving the audio signal;

an audio signal amplifying circuit, coupled to the echo cancellation circuit and used for receiving and amplifying the audio signal outputted from the echo cancellation circuit;

a loudspeaker, coupled to the audio signal amplifying circuit coupled to the audio signal amplifying circuit for playing sounds corresponding to the audio signals from the audio signal amplifying circuit;

a function key on the computer mouse, the function key being configured to selectively switch the computer mouse to function as a hands-free handset, wherein the computer mouse is configured to selectively function as a hands-free handset when matched with a Bluetooth enabled mobile phone; and a locking mechanism configured to lock the computer when the locking mechanism detects that the Bluetooth module is not transmitting the signals, the locking mechanism being further configured to unlock the computer when the signals are detected from the Bluetooth module.

2. The computer mouse as recited in claim 1, wherein the electric source module further comprises a voltage step-up circuit.

3. The computer mouse as recited in claim 1, wherein the electric source module employ a power supply selected from one of the following: an one-time-battery or a rechargeable battery.

4. The computer mouse as recited in claim 1, wherein the Bluetooth module is further connected to a power LED and a link LED.

5. The computer mouse as recited in claim 1, wherein the Bluetooth-enabled wireless communication device is a device selected form the group consisting of a mobile phone, a computer with built-in Bluetooth module, and a computer with external Bluetooth module.

6. A computer mouse with Bluetooth hand-free handset, capable of matching and communicating with a Bluetooth-enabled wireless communication device, comprising:
- an electric source module, for providing power to the computer mouse;
- an input driving circuit, for receiving signals inputted by a user and converting/transferring the same to a computer;
- a Bluetooth module, coupled to the input driving circuit, wherein the Bluetooth module is connected to an antenna for transmitting/receiving signals;
- an echo cancellation circuit, coupled to the Bluetooth module and used for canceling echoes of audio signals;
- a sound receptor, coupled with the echo cancellation circuit for receiving the audio signal;
- an audio signal amplifying circuit, coupled to the echo cancellation circuit and used for receiving and amplifying the audio signal outputted from the echo cancellation circuit;
- a loudspeaker, coupled to the audio signal amplifying circuit coupled to the audio signal amplifying circuit for playing sounds corresponding to the audio signals from the audio signal amplifying circuit;
- a function key on the computer mouse, the function key being configured to selectively switch the computer mouse to function as a hands-free handset, wherein the computer mouse is configured to selectively function as a hands-free handset when matched with a Bluetooth enabled mobile phone; and
- a locking mechanism configured to lock the computer when the locking mechanism detects that the Bluetooth module is not transmitting the signals, the locking mechanism being further configured to unlock the computer when the signals are detected from the Bluetooth module.

7. The computer mouse as recited in claim 6, wherein the electric source module further comprises a voltage step-up circuit.

8. The computer mouse as recited in claim 6, the electric source module employing a power supply selected from one of the following: an one-time-battery or a rechargeable battery.

9. The computer mouse as recited in claim 6, wherein the Bluetooth module is further connected to a power LED and a link LED.

10. The computer mouse as recited in claim 6, wherein the Bluetooth wireless computer mouse is substantially a Bluetooth keyboard.

11. The computer mouse as recited in claim 6, wherein the Bluetooth-enabled wireless communication device is a device selected form the group consisting of a mobile phone, a computer with built-in Bluetooth module, and a computer with an external Bluetooth module.

* * * * *